3,007,033
INERT GAS SHIELDED METAL ARC
WELDING
Arthur J. Newman, North Plainfield, N.J., and Gustav Reinhardt, Grand Island, N.Y., assignors to Union Carbide Corporation, a corporation of New York
Filed Apr. 15, 1959, Ser. No. 806,713
2 Claims. (Cl. 219—137)

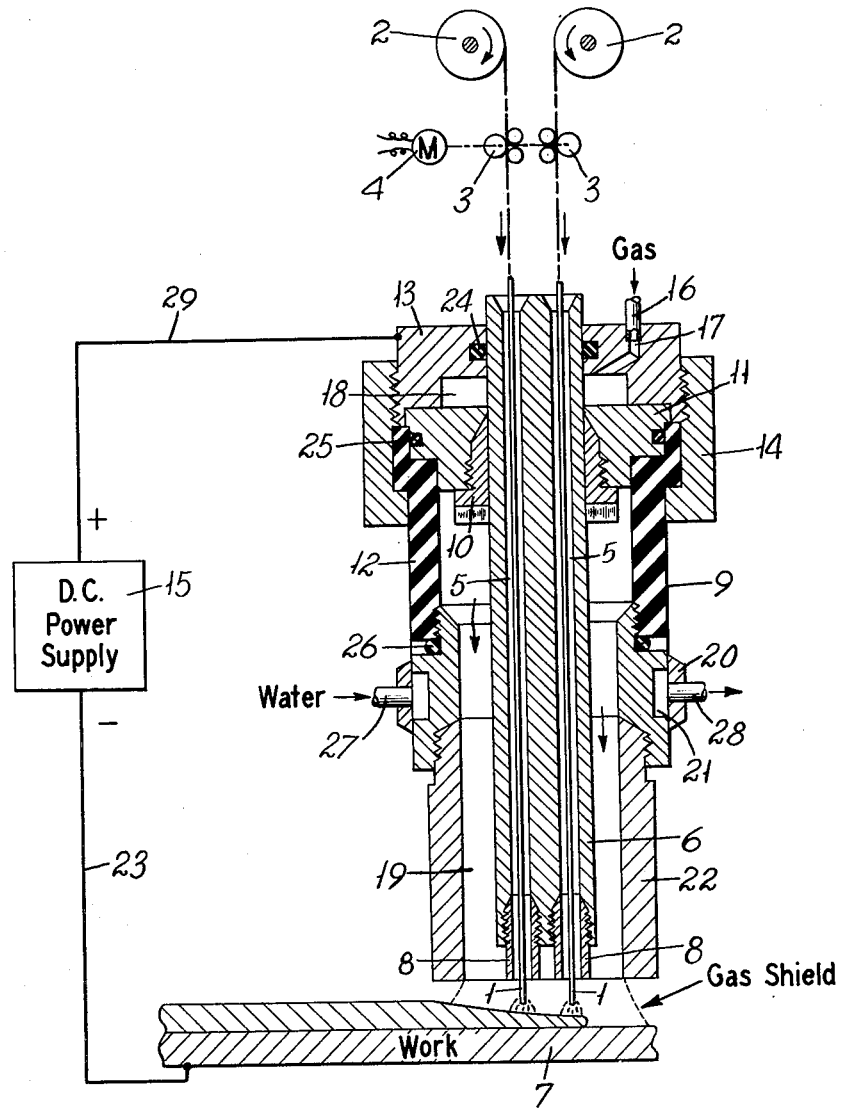

This invention relates to inert gas shielded metal arc welding and, more particularly, to such welding at relatively high current density with multiple electrodes of fusible metal.

The inert gas shielded metal arc process has enjoyed wide acceptance in recent years for the welding of aluminum. The process has been restricted, however, by a limit in current beyond which acceptable welds may not be obtained. Therefore, it has been necessary to resort to multiple-pass techniques for welding of aluminum in heavy sections. Faster, more economical high-quality welding methods are in increasing demand with the present expansion of the aluminum industry.

The problem of the limiting current in aluminum sigma welding was recognized by the art according to Muller et al. 2,504,868, and has since been the subject of research. Generally, the limiting current for single-electrode sigma welding of aluminum with argon shielding gas was found to be 400 to 450 amperes, the highest being about 600 amperes. The use of currents above such limit results in an extremely rough weld surface consisting of folds of oxides and nitrides of aluminum, a condition which is totally unacceptable even in its mildest form.

Several methods have been tried to increase the usable welding current in single-electrode sigma welding of aluminum. Apparently the most effective method is the use of helium shielding gas which raises the limit to 650 amperes. It has been reported that 1-inch thick aluminum plates have been successfully welded using a current of 650 amperes with helium gas. It is generally found that the stability is not entirely satisfactory and spatter is increased with helium shielding gas. Mixtures with argon are often used to overcome this. Other methods were found which provide small increases in the usable current range. These included the use of relatively high welding voltages, special fluxes added to the welding zone, forward deflection of the arc, and special cleaning of rod and plate. Such methods are generally undesirable since they add to the cost of welding and/or reduce the penetration.

The desired increase in current should be gained with a desirable weld nugget contour and at a minimum of increase in cost to the fabricator.

The main object of this invention is to substantially increase the current limit encountered in the shielded inert gas metal arc welding of aluminum, as well as magnesium and alloys thereof.

The present invention provides a novel method whereby relatively thick plates may be welded rapidly in a single pass. This is achieved by the use of two or more suitably spaced electrodes with parallel power connection, direct current, reverse polarity, under which conditions welding in a common weld crater or puddle is made possible with welding current having a value that is substantially more than the sum of the maximum welding currents of such wire anodes with which it is possible to obtain satisfactory welds when used separately.

When welding at such high current values which range up to 1500 amperes and higher, which substantially is more than twice the previous established maximum limit for conventional single-electrode techniques, electrode melt-off rates are increased to from 20 to 25 pounds per hour, and aluminum plates up to one inch in thickness may be welded in a single pass. Adequate penetration, desirable nugget shape and surface contour characterize welds performed at these current levels. In addition, savings of 60% in welding time and 20% in shielding gas consumption are effected by the present procedure over prior standard single-electrode techniques.

The efficiency of welding at higher currents seems to increase with corresponding increases in spacing between the electrodes and the electrode diameter. Dual electrodes, each ⅛ inch in diameter and spaced ⅝ inch apart, were utilized very successfully in welding ¾- and 1-inch sections at currents of the order of 1500 amperes. Argon was found to be an excellent shielding medium when fed to the arc at a rate of from 120 to 180 cubic feet per hour. It is important when welding in accordance with the present invention that a gas cup be employed which has appropriate dimensions to provide adequate shielding of the weld puddle.

A surface bead weld was made on ¾ inch aluminum plate using two ⅛ inch aluminum electrodes, spaced ⅝ inch apart, in parallel power arrangement, DC—RP. The current was progressively increased from 1300 amperes at 27 volts and travel speed was maintained at about 25 inches per minute. Argon was fed at 180 cubic feet per hour. Acceptable welds were produced at 1500 amperes.

In the drawing:

The single figure is a view mainly in vertical cross section of welding apparatus illustrating the invention.

As shown in the drawing, wire electrodes 1, 1 are drawn from wire supply reels 2, 2 by feed rolls 3, 3 which are driven by a motor 4. Such electrodes are advanced by such feed rolls through parallel passages 5, 5 in a copper core 6 toward a workpiece 7 during the welding operation. Contact tips 8, 8 are provided in the outlet ends of such passages. The core 6 is supported in torch 9 by a split collet positive power contact member 10 which is threaded into a collar 11 that clamped between an insulator cylinder 12 and a metal annulus 13 by a nut 14. Welding current is conducted to the annulus 13 through a lead 29 from the positive terminal of direct current power supply 15.

Inert monatomic gas, such as commercially pure argon and/or helium, is delivered to the upper interior of torch 9 through a gas pipe 16 that is connected to an inlet 17 leading to an annular gas chamber 18 which is in communication with annular gas passage 19 below the member 10. An annular metal body 20 that is provided with a cooling water chamber 21 is threaded to the lower end of the cylinder 12, and supports a gas nozzle or cup 22 which surrounds the lower portion of the core 6 in spaced relation to provide an annular outlet passage for the arc shielding gas. The workpiece 7 is connected to the negative terminal of power supply 15 by a ground lead 23. Sealing O rings 24, 25, and 26 are used in the torch to prevent gas leakage. Water is circulated through the chamber 21 between inlet 27 and outlet 28 provided in the body 20 to keep such torch from overheating in use.

Operation of such apparatus will be clear to those skilled in the art from the following description of tests involving the invention.

Tests with such parallel power dual-electrode equipment showed that this method is the most desirable for high-current welding of aluminum, both from the standpoint of simplicity of equipment and quality of the welds produced. In general, the equipment is only slightly more complicated than ordinary single-electrode equipment by the addition of a second electrode. The welds had a desirable nugget shape, adequate penetration, and good surface contour when properly made. Generally, porosity-free welds were obtained without the use of shielding gases other than argon and without the use of special fluxes or cleaning of the wire and plate.

The tests made with the illustrated torch 9 covered a broad range of conditions in order to establish the working range of the process. In order to determine the maximum current limits, a series of surface deposits were made using a constant travel speed of 25 i.p.m. and a welding voltage of 25–27 volts; the current was increased as the weld progressed and the current at which the puddle became turbulent was noted. The results obtained with ⅛ inch diameter electrode in various spacings are listed below:

| Rod spacing, inches: | Maximum current limit, amperes |
|---|---|
| ¼ | 1000 |
| ½ | 1375 |
| ⅝ | 1500 |

A limit of 900 amperes was noted with 3/32 inch electrodes in ¼ inch spacing, but no limits could be determined for greater spacings with 3/32 inch or ⅛ inch electrode since the maximum current which could be used in these tests was limited by the maximum speed of the available rod-feeding mechanism. Smooth welds were made with a current of 1200 amperes with the 3/32 inch electrodes in ½ inch spacing.

A number of tests were also run to determine if there was a minimum current at which the action became unstable. It was generally noted that as the current was reduced, the smooth arc action was replaced by a loud crackle. With further reduction in current, the action visibly changed from that of two arcs operating simultaneously, to one arc which alternated from one electrode to the other at a rate of a few alterations per second. The current at which the action changes was usually about 250 to 300 amperes with the three sizes of electrodes spaced from ¼ to ⅝ inch, with the one exception of ⅛ inch electrode with ⅝ inch spacing where the transition took place at 450 to 500 amperes. All these tests were made with voltages in the range of 19 to 23 with a travel speed of 12 i.p.m. Generally, the tests show that the parallel power system may be used at currents down to a limit of about 250 to 500 amperes with no difficulty, but no advantage can be seen for this process for low currents which can be handled effectively with single-electrode techniques.

In order to establish a range of working currents and travel speeds, several surface bead welds were made with travel speeds ranging from 12 to 45 i.p.m., and the current was varied during each weld. It was generally noted that a current range was obtained throughout which the surface of the weld was most desirable, i.e. smooth surfaced. It was noted that spatter increased as the speed increased, and it was especially bad at the lower currents; hence, the recommended current was increased with speed. Also, the surface became rough at high currents with low speed. A somewhat different current range could be expected when welding in a beveled groove from that shown for surface beads. Also, the most desirable current range would be expected to be higher with a ⅛ inch electrode and lower with a 1/16 inch electrode than that shown for a 3/32 inch electrode.

It may be said that the melting rate is not highly influenced by the electrode diameter over the range of 1/16 to ⅛ inch or the alloy content over the range indicated. The effect of spacing is also very slight over the range studied. Two electrodes operating with parallel power resulted in about an 8 to 10% increase over a single electrode and three electrodes about a 25% increase over two electrodes.

In the tests made with two torches with parallel power, a spacing of 2¼ inches was used. The welds made with such arrangement were somewhat more narrow and higher than those made with the single cup. Shielding gas requirements were approximately twice those of a single electrode. It was impossible to determine an upper current limit since the shielding gas cups melted at about 800 amperes. Such current level of about 800 amperes was apparently below the current at which the puddle became turbulent. The cups always tended to melt on the sides between the two electrodes, probably because of the concentration of heat in such region.

Tests were made with such apparatus to determine if there was any effect on operation at the lower currents. For example, it was noted that two arcs could exist simultaneously at currents down to about 600 amperes where only one arc operated at a time, depending on electrode diameters. The welding action with two torches was considerably different from that of a single torch having a single cup, as the oscillation of the arc was much slower and the arc did not shift until the electrode feeding with no arc shorted into the plate. At such point, a loud report accompanied the transfer of the arc. Since it was possible to electrically separate the two electrodes with such equipment, oscillograms were made of the current in each electrode.

Another series of tests were made with the large dual wire torch. Most of the testing was carried out with currents in the vicinity of 1000 amperes using 3/32 inch electrode as this was recognized as a practical current level for development of the process and equipment since a current limit of about 1250 amperes would be expected with the ½ inch spacing provided with the torch. The tests culminated in a demonstration of welding at this current under conditions that produced welds which are similar to those being produced regularly by a manufacturer of aluminum tanks using present single-electrode techniques. The weld was made in ¾ inch thick type 5152 plate which was beveled with a 60° groove, ⅜ inch deep, and welded from one side using no backing. Then the joint was back-chipped and welded from the opposite side with the same welding conditions and groove preparation. The conditions used are shown below, in comparison with single-electrode techniques used by the tank manufacturer:

| Method electrode | Amperes | Volts | Speed i.p.m. | Cup size | Cup ht. in. | Argon flow c.f.h. | Electrode |
|---|---|---|---|---|---|---|---|
| Single | 370–380 | 26 | 12 | 10 or 12 | ½ | 40–50 | 3/32 or ⅛ inch No. 64. |
| Dual | 1,000 | 23 | 30 | 24 | 3/16 | 80 | 3/32 inch No. 64. |

The resultant weld was fully penetrated with good reinforcement and nugget contour and was X-ray sound. Some rather heavy drag lines were noted on the surface but it was felt that this was not a serious condition and could be improved with improved shielding cup design which would provide better shielding of the molten puddle. The comparative figures represent a 60% saving in welding time and about a 20% saving in argon of the invention over the prior art.

During the tests it was found that operation of the dual-wire parallel power equipment was generally comparable to standard single-electrode equipment with the exception of the following: It is important that the electrode be well straightened. Extreme wavering of the electrodes results in an unstable, turbulent puddle. A very close spacing of the gas shielding cup (3/16 to 5/16 inch) is necessary in order to get good shielding with economical gas flow rates.

As has been stated previously the welding action, at currents above the current limit known to prior art, is noted as a turbulent puddle. The liquid metal is stirred into layers or folds and is held in this position apparently by the surface tension of the surface layer. Such condition has been experienced on both aluminum and magnesium. Characteristics common to both of these metals which would seem to make them subject to the limiting current are their comparatively low density, low melting and boiling points, and a strong tendency to form surface oxide or nitride films. The force exerted upon the liquid puddle by the welding arc is known to increase as the current is increased. When the force is sufficient to accelerate the liquid metal to a sufficiently high velocity, a turbulence of the liquid metal results. The turbulence may be seen visually and has been studied through the medium of high-speed photography. The arc forces may be aided in creating turbulence of the puddle by high thermal gradients surrounding the arc spot, a velocity gradient between liquid metal and oxide layer, and possibly boiling of the metal over a small area. The turbulent motion of the puddle may then cause sufficient disturbance of the shielding gas to cause infiltration of air or cause any existing oxide layer to be stirred into the puddle.

It has been noted that air infiltration results in a condition which, from all appearances, is the same as welding above the limiting current, and welding with currents approaching the limiting value requires optimum shielding of the puddle. Evidence of air infiltration was obtained by analysis of the surface layer on a weld made above the limiting current. The rough "fins" or "folds" formed on the surface of the weld were found to be brittle. Several of these pieces were removed from a weld made with precautions to prevent contamination. The residue obtained after reaction with sodium hydroxide was analyzed by means of electron diffraction and found to be aluminum nitride. Analysis was also made of the black, soot-like material which had been observed on welds made under good welding conditions. X-ray diffraction analysis indicated this material to be aluminum. This was apparently vaporized material which had condensed on the cool plate surface.

The importance of turbulence causing the oxide layer present on the plate surface to interact with the puddle has been noted through the use of high-speed photography. The weld is smooth and clean where it is surrounded by a cleaned zone, but where the weld metal overlaps the cleaned zone, it has a rough, dirty appearance. This causes the turbulent puddle to interact with uncleaned metal at a definite current level where the crater width exceeds the cleaned zone width. This has been further substantiated by welding tests in an evacuated chamber flooded with argon which presumably eliminated the possibility of air infiltration and showed the presence of a current limit. While the importance of cleaning action is recognized in this respect, it should not be regarded as the controlling mechanism, since welds having smooth surfaces may be made without cleaning action at the plate surface by using straight polarity current if the current is kept below the point at which the puddle becomes turbulent.

The foregoing discussion indicates that in order to weld aluminum at high currents, it is necessary to reduce the concentration of forces on the puddle surface which creates turbulence of the liquid metal. Adequate shielding from the atmosphere and increased cleaning action are also of primary importance. The manner in which multiple-electrode parallel power welding distributes the arc forces over a larger area of the puddle surface has been observed with high-speed photography where it was observed that the arcs impinge on the puddle over a larger area than in single-electrode welding. A considerable increase in the width of the cleaned zone is also noted.

If the importance of the size of area over which the arcs impinge as discussed above is valid, high-speed motion pictures also give an explanation of the effect of electrode spacing on current limit. It was noted that the arcs generally are directed toward each other because of the associated magnetic force of two parallel current-carrying conductors. As the spacing is reduced, the deflection becomes greater for a given current, resulting in a smaller area over which the arcs are distributed and consequently a lower current limit. It was noted that in some cases where a ¼ inch spacing was used the drops from one electrode were forced toward the other electrode so extensively that they actually formed a bridge across the two electrodes which supported a single arc momentarily.

The effect of arc voltage on current limit is difficult to predict since two opposing effects might be expected to take place. (1) Increasing arc length increases size of the individual arc spots and should, therefore, result in an increased current limit. This has been found to be true in single-electrode welding. (2) Increasing arc length would allow the arc to be deflected more toward each other, resulting in a concentration of force at the puddle surface and a resultant decrease in current limit.

What is claimed is:

1. Inert monatomic gas shielded multiple electrode metal arc welding of aluminum and magnesium, which comprises simultaneously feeding a plurality of fusible metal wire anodes in closely spaced parallel relation toward a common pool of weld metal on a metal work cathode to be welded, shielding such electrodes with a common stream of inert monatomic gas selected from the class consisting of commercially pure argon and helium, and energizing parallel welding arcs between such work cathode and wire anodes from a common source of direct current, creating such common pool of weld metal in such work cathode with welding current having a value that is substantially more than the sum of the maximum welding currents of such wire anodes with which it is possible to obtain satisfactory welds when used separately.

2. Process of welding metal selected from the class consisting of aluminum and magnesium with inert gas shielded metal arcs which comprises simultaneously feeding two separate relatively closely spaced wire anodes toward a common welding site on the work to be welded connected by a common ground to the negative terminal of circuit to a direct current supply source of welding current, and forming a common pool of weld metal by energizing parallel welding arcs between the ends of said wire anodes and such work with said source of welding current by passing said electrodes along contact surfaces connected to the positive terminal of said welding current source, while shielding said arcs with inert monatomic gas, such welding current having a value that is substantially more than the sum of the maximum welding currents of such wire anodes with which it is possible to obtain satisfactory welds when used separately.

References Cited in the file of this patent

UNITED STATES PATENTS

| | | |
|---|---|---|
| 2,504,868 | Muller et al. | Apr. 18, 1950 |
| 2,658,162 | Tichenor et al. | Nov. 3, 1953 |
| 2,868,956 | Lobosco | Jan. 13, 1959 |